July 8, 1952  R. L. HEIDER  2,602,817
EXTRACTION OF DIMETHYLACETAMIDE
Filed June 24, 1949
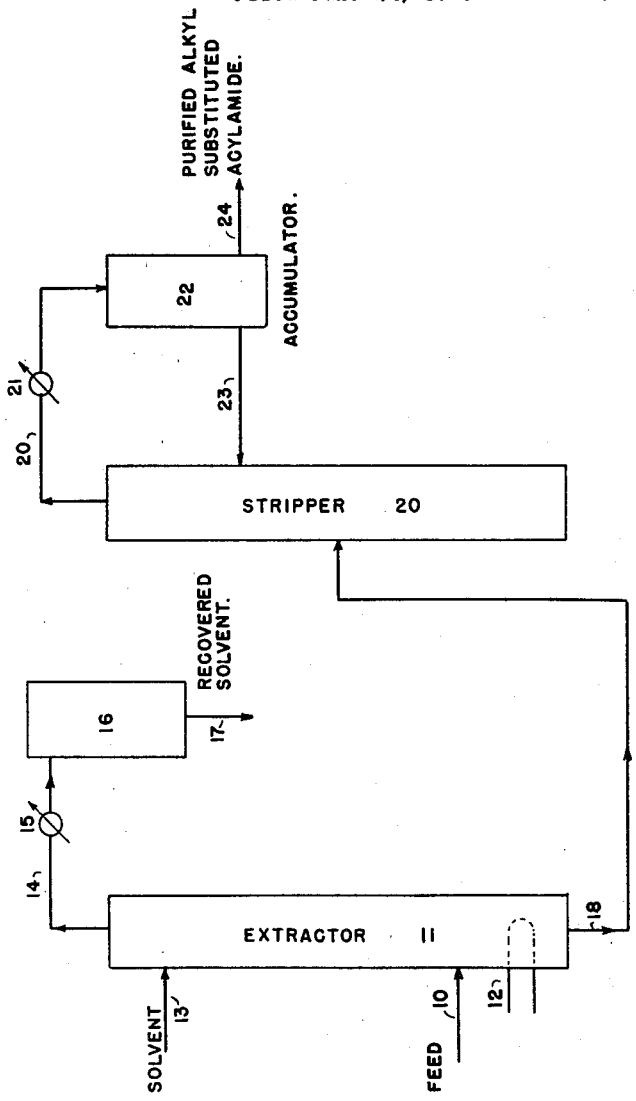
INVENTOR.
RUDOLPH L. HEIDER.
BY Herman O. Bauermeister
his attorney Patented July 8, 1952

2,602,817

UNITED STATES PATENT OFFICE 2,602,817

EXTRACTION OF DIMETHYLACETAMIDE

Rudolph L. Heider, Dayton, Ohio, assignor to Monsanto Chemical Company, St. Louis, Mo., a corporation of Delaware Application June 24, 1949, Serial No. 101,203

3 Claims. (Cl. 260—561)

The present invention relates to a purification process for alkyl-substituted acylamides.

It is an object of the invention to purify and isolate alkyl-substituted acylamides, such as dimethylacetamide. It is also an object of the invention to utilize certain solvents which have been found to possess chemical affinity which is particularly effective with respect to such acylamides in the purification thereof from technical mixtures.

It is also an object of the invention to provide a continuous process whereby contaminated solutions of acylamides resulting from industrial processes may be purified for reuse. Another object of the invention is to provide anhydrous substituted acylamides by a method superior to the processes of the prior art. Other objects of the invention will become apparent hereinafter.

The production of substituted acylamides is commonly attended by the formation of azeotropes, such as constant-boiling compositions with acids, which are described in an article by J. R. Ruhoff and E. Emmett Reid, "A series of aliphatic dimethyl amides," Journal of the American Chemical Society, 59, 401 (1937). Consequently it is difficult to purify these substituted acylamides, since distillation processes are inadequate for the isolation of the desired compounds. For example, dimethyl formamide is usually obtained as an azeotropic mixture boiling at 153.2° C. with formic acid, and dimethyl acetamide occurs as a constant boiling mixture with acetic acid boiling at 170.8° C. at atmospheric pressure. While it is possible to obtain more concentrated compounds by a vacuum distillation operation in combination with conventional distillation, such a procedure is laborious and expensive. Furthermore, it has been found that distillation methods fail to remove the last minor proportions of water, so that such purification fails to achieve the requirements for an anhydrous product.

The recovery process of the present invention is of particular value in the recovery of alkyl-substituted amides from aqueous solutions. Such solutions occur, for example, in the spinning of fibers by processes in which such alkyl-substituted acylamides serve as solvents. Aqueous solutions obtained in this way usually vary from 10% to 50% by weight of the acylamide. However, the present invention is applicable to all concentrations, including stronger solutions from which it is desired to remove small proportions of water. Dilute solutions of alkyl-substituted acylamides may also be obtained in other industrial processes in which the amides function as solvents. One source of dilute aqueous solutions of dimethyl acetamide and analogous compounds is the process for recovering acetylene by the use of the amide as the solvent to recover acetylene from the combustion process gases in which the acetylene is accompanied by water and methane.

An advantage of the present process over conventional distillation is the reduction of hydrolysis of the alkyl-substituted acylamide. The distillation process, including heating as the conventional separation method, may result in hydrolysis losses of 1%, and also cause the product to be contaminated with hydrolysis products.

Non-aqueous solutions of alkyl-substituted acylamides may likewise be employed in the purification process of the present invention, for example, glycerine solutions of the amides, such as may result from various industrial processes, may be employed.

Other processes in which alkyl-substituted acylamides are obtained may be employed in conjunction with the present purification process. For example, the production of alkyl-substituted acylamides from amines and ketene derived from acetic acid is particularly applicable to purification by the present process, since the product obtained from such manufacturing methods results in the production of the amide, together with considerable quantities of water which must be removed in order to obtain the pure alkyl-substituted acylamide, such as dimethyl acetamide, for example.

In general, the alkyl-substituted acylamides which may be purified by the process of the present invention comprise the group characterized by 1 to 4 carbon atoms in each of the alkyl chains, where such chains are substituted, although the nitrogen of the amine may also have a hydrogen atom connected thereto as in the monoalkyl-substituted compounds. The general group of compounds applicable to purification by the present process also includes the group characterized in having from 1 to 4 carbon atoms in the acyl group. A preferred group of amides is characterized in having from 1 to 2 carbon atoms on the alkyl chains and from 1 to 2 carbon atoms on the acyl group.

The foregoing and other objects of the invention are accomplished in the present invention in which the alkyl-substituted acylamides, usually prepared as a solution in water or other solvents, are contacted with an organic donor compound capable of hydrogen-bonding. The hydrogen-bonding donor compound has a limited solubility in water and functions to extract the substituted amide, so that the complex formed thereby is separated from the excess water.

Hydrogen-bonding is a concept advanced in recent years to explain certain abnormalities in the chemical and physical behavior of mixtures of compounds, one of which contains hydrogen attached to a stronger negative radical and the other an atom capable of donating a pair of electrons to form a directional or coordination bond. Since the bond is formed by the donation of an electron pair from one atom, the donor, to the other atom the bond is not of the type considered to be an ordinary valence bond, but many of the properties of the mixture indicate that a type of chemical compound is formed. These mixtures, for instance, exhibit an abnormal vapor phase lowering, that is, a deviation from Raoult's law. There is further observed abnormal heats of mixing and abnormal deviation in viscosity and freezing point lowering. I have found that when an alkyl-substituted acylamide is mixed with an organic hydrogen-bonding donor compound, it exhibits characteristics unexplainable upon the basis of ordinary chemical reaction and unexpected from a consideration of the characteristics of the materials mixed. Apparently the substituted amide has an acceptor nitrogen atom and forms some type of compound with a hydrogen-bonding donor.

It will be understood that in advancing the theory of hydrogen-bonding to explain the unexpected results of the present invention, I do not intend to be limited or restricted by this theory. The theory may or may not be correct and for the purposes of the present invention it is of importance largely because whatever the reason the type of compounds known to be organic hydrogen-bonding donors exhibit a selective effect which is useful in separating the substituted acylamides from water and other solvents, and in achieving anhydrous solutions of the desired amides.

In general, compounds falling into five classes may serve as the organic hydrogen-bonding donor compounds of this invention, and so far as I have been able to find, any substances in these classes may be used, provided that they are within the volatility limits hereinafter specified. In general, no lower or upper limits need be imposed on the boiling points of these solvent compounds, since the process of the present invention may be carried out with solvents boiling from room temperature to as high as may be desired, subject to the following limitations. The classes are:

1. Compounds containing halogens attached to hydrocarbon compounds having from 1 to 5 carbon atoms, and in which at least one such aliphatic carbon atom has attached to itself from 1 to 3 halogen atoms and at least one hydrogen atom. A preferred group of such halogenated hydrocarbon compounds consists of the group of chloroform, ethylene dichloride, and 1,1,2-trichlorethane;

2. Oxygenated compounds boiling at atmospheric pressure at temperatures at least 20° C. and preferably at least 50° C. removed from the boiling point of the particular alkyl-substituted acylamide which it is desired to purify. Specific types of donor compounds within the field of oxygenated compounds are the organic acids, such as 2-ethyl hexanoic acid, ketones, such as 1-decanone, aldehydes, such as octaldehyde, and alcohols, such as nonyl alcohol;

3. Nitrogen compounds, such as higher amines boiling at atmospheric pressure at temperatures at least 20° C. and at least 50° C. removed from the boiling point of the particular alkyl-substituted acylamide which it is desired to purify. A typical compound of this type is lauryl amine or the technical amine mixtures which are obtainable from the amination of naturally occurring and chemically derived fats and fatty acids;

4. Compounds containing sulfur, typically tetradecyl mercaptan-1 and other mercaptans, boiling at atmospheric pressure at temperatures at least 20° C. and preferably at least 50° C. removed from the boiling point of the particular alkyl-substituted acylamide which it is desired to purify;

5. Compounds containing phosphorus, such as dibutyl phosphate and other alkyl phosphites and phosphonites, which boil at atmospheric pressure at temperatures at least 20° C. and preferably at least 50° C. removed from the boiling point of the particular alkyl-substituted acylamide which it is desired to purify.

In addition to the use of single compounds characterized by furnishing hydrogen-bonding donor groups, mixtures of such compounds, from the same, or different classes, may also be employed in the process of the present invention.

The purification process of the present invention is applicable to various N-monoalkyl or N,N'-dialkyl acylamide having from 1 to 4 carbon atoms in each alkyl substituent, which substituents may be the same or dissimilar radicals in the same molecule. The aliphatic hydrocarbon radical present in the acyl group may have from 1 to 2 carbon atoms. A representative group of such acylamides to which the present invention is applicable, particularly in aqueous solution, are the amides prepared as the aliphatic dimethylamides described by Ruhoff and Reid above.

I have found that the difficulty attending the purification and isolation of alkyl-substituted acylamide may be overcome by contacting the crude mixtures of such compounds with particular chemical solvents having active hydrogen atoms, so that my solvent extraction process enables such alkyl-substituted acylamides to be removed as a separate liquid phase by virtue of the peculiar chemical bonding occurring between such alkyl-substituted acylamides and the designated chemical solvents having active hydrogen radicals.

The compounds constituting the preferred type in the present application, as providing the source of active hydrogen bonds, are the group of halogen-substituted hydrocarbons having from 1 to 5 carbon atoms. In general, the compounds which I may utilize, have a molecular configuration in which at least one aliphatic carbon atom has attached to itself from 1 to 3 halogen atoms, and at least one hydrogen atom. Compounds representative of this class of halogenated hydrocarbons include chloroform, methylchloroform, 1,1-dichlorethane, symmetrical tetrachlorethane, 1,2-dichlorethane, and other analogous compounds. In place of the chlorine-substituted compounds, other halogen-substituted compounds, such as the corresponding fluorine, bromine and iodine compounds may be employed.

The present process of purification or separation of the alkyl-substituted acylamides may be carried out by mixing such compounds in the form of technical mixtures of fouled or spent solutions with the chemical compound having active hydrogen atoms. Agitation may also be employed to improve the rate of mixing. Single or multiple contacts may be employed in batch or continuous contacting means, such as packed towers. After the solutions have been contacted, a separation step, such as gravity separation or centrifuging may be employed to remove the rich solvent containing the alkyl-substituted acylamide from the original mixture or starting solution. The rich solvent is then stripped, preferably by distillation to separate the alkyl-substituted acylamide, after which the lean solvent may be recycled. The process may be operated at atmospheric pressure or under vacuum or superatmospheric pressure.

As illustrations of embodiments of the present invention, the examples below show some of the procedures which may be employed in carrying out the invention:

Example 1

Dimethylacetamide was obtained as a 50 weight percent aqueous solution. Two hundred parts by weight of this crude material was contacted in four successive batch contacts, which in total corresponded to an equal amount of chloroform in a batch extraction system employing four contacts with the extractant. The recovery of dimethylacetamide amounted to 97 parts by weight (97% recovery). It was found that other halogen-containing compounds gave comparable recoveries of alkyl-substituted acylamides from various technical solutions under similar conditions. Measurements of various physical properties indicated that hydrogen-bonding occurs between the alkyl-substituted acylamide and the compounds of the present invention, such as chloroform, unsymmetrical trichlorethylene and the like, so that a selective solvent fractionation occurs.

Example 2

A solution of dimethylformamide in water was provided for an extraction test. The purification process was operated in a countercurrent extraction tower employing symmetrical tetrachlorethane as the solvent. Ten parts by weight of a 10% aqueous solution of the amide gave a recovery of 90% of substantially pure dimethylformamide as the result of continuous countercurrent extraction with 20 parts by weight of the symmetrical tetrachlorethane, followed by distillation to separate the dimethylformamide.

I have also found it to be possible to carry out the process of the invention with impure and technical grades of the extractive compounds, such as are ordinarily available at 90% to 95% purity. Mixtures of hydrogen-bonding extractive solvents may also be employed, such as the technical mixtures which result from the chlorination of methane, ethane, ethylene or other light fractions of hydrocarbon gases containing from one to three carbon atoms. Such chlorinated hydrocarbons should contain from 1 to 5 carbon atoms in which at least one carbon contains from 1 to 3 chlorine atoms and at least one hydrogen atom.

Example 3

A five-carbon chlorinated hydrocarbon was selected for testing as an extractive solvent. N-amylchloride was employed in a single contact with a dilute solution of dimethylacetamide. A volume of solvent equal to the volume of the amide present in the solution gave a recovery of 8% of the amide after a single contact, and separation of the organic layer.

Example 4

The extraction of N-monomethylacetamide, $CH_3NHCOCH_3$, was demonstrated by taking 25 volumes of this compound together with 25 volumes of water as a homogeneous solution. The contacting solution was 25 volumes of chloroform which was added as a single batch contact. The extraction layer which separated after mixing showed a 12% recovery in a single contact of the initial N-monomethylacetamide.

Example 5

The extraction of diethylformamide from a solution with an equal volume of water was tested by the use of chloroform employed to the extent of 50% by volume of original aqueous solution. After a single contact and agitation, the lower organic layer was separated to give a 76% recovery of the original diethylformamide.

Example 6

Dimethylacetamide as a 50% by volume of solution with water was extracted with 50% of tetradecyl mercaptan-1. A single contact resulted in the extraction of 4% of the original dimethylacetamide.

Example 7

The use of a branched chain mercaptan as the hydrogen-bonding extraction medium was shown with the dimethylacetamide solution. A 50% solution of the amide in water was contacted with 50% by volume of tertiary octyl mercaptan. After settling of the aqueous and organic layers it was found that the amount of amide present in the mercaptan layer was 4% of the starting material.

Example 8

A 50% solution of dimethylacetamide in water was extracted with 50% by volume of nonyl alcohol. After agitation of the mixture and separation of the organic layer, the extracted amide amounted to 16% by volume.

Example 9

The use of a phosphorus compound as the extraction medium was tested by the use of a 50% solution of dimethylacetamide. It was found that when the aqueous solution was shaken with 50% by volume of dibutyl phosphite that the extracted amide amounted to 16% by volume.

Example 10

The efficiency of aldehydes as extraction media was illustrated by the use of octaldehyde (2-ethyl hexaldehyde) which was employed to the extent of 50% by volume with a solution of equal parts of dimethylacetamide and water. The separated organic layer showed a recovery of 20% by volume of the original dimethylacetamide.

Repetition of the above experiment with n-hexaldehyde showed the recovery of a small proportion of the originally present amide.

Example 11

The use of ketones as hydrogen-bonding extraction media was illustrated with methyl n-hexyl ketone, which was employed to the extent of 50% by volume of an aqueous solution in which dimethylacetamide had been dissolved with an equal amount of water. After shaking the mixture and allowing the aqueous and organic layers to settle, it was found that a small proportion of the amide was present in the methyl n-hexyl ketone.

The alkyl-substituted acylamides which are to be purified may be utilized in various technical mixtures. Thus, the process of the present invention may be applied to aqueous or non-aqueous solutions, which may also contain minor proportions of the various raw materials, such as acids and amines, from which the amides are prepared. Spent solutions diluted with various compounds resulting from the use of alkyl-substituted acylamides as industrial solvents may also be purified to recover such amides by the process of the present invention.

The proportions of the alkyl-substituted acylamide and the extractive solvent may be varied in accordance with the degree of recovery which is desired in a batch or continuous process. In general, the proportions are not critical, and the hydrogen-bonding donor solvent may be employed in the range of one-fourth to ten times the amount of the amide which is to be recovered from a solution.

In the accompanying drawing which portrays diagrammatically equipment which may be used in carrying out the present invention, the crude amide is fed via line 10 into extractor 11, which may be equipped with heating means 12. The hydrogen-bonding donor solvent is fed into the top of the extractor column via line 13. As a result of the extraction operation the overhead product is obtained and withdrawn from the column via line 14, and cooled in cooler 15. Such product may be collected in receiver 16, in which a separation may be effected to recover a portion of the solvent via line 17.

The rich solvent containing the alkyl-substituted acylamide is withdrawn from the bottom of extractor 11 via line 18, and then passes into stripper 20. The stripper may also be provided with heating means 21 which may also function as a sparger for the introduction of inert gases, if desired. An overhead product is withdrawn via line 22 from stripper 20 and is then passed through cooler 21 into accumulator 22. A portion of the product may be returned as reflux to the stripper by means of line 23, and the purified alkyl-substituted acylamide may be withdrawn via line 24. The lean solvent is withdrawn from stripper 20 via line 25, and then may be returned to the extractor in a continuous process.

The operating conditions in carrying out the present invention are not critical. The extraction may be effected at atmospheric or elevated pressures and temperatures, although higher temperatures are preferred, since the solubility of the alkyl-substituted acylamides in the hydrogen-bonding solvent increases with the thermal activation of the solvent compounds providing the hydrogen bonding effect.

Since many changes could be made in the above methods and the exemplary flow sheet without departing from the scope of the invention, it is intended that all matter contained in the above description shall be interpreted as illustrative and that my invention is not to be limited to the specific compositions and processes herein-described or specifically covered by my claims.

The nature and objects of the present invention having been thus described and illustrated, what is claimed and is desired to be secured by Letters Patent of the United States is:

1. In a process for producing substantially pure dimethylacetamide, from an aqueous solution thereof, the steps of contacting said solution with a chlorinated hydrocarbon of from 1 to 5 carbon atoms in which at least one of said carbon atoms has attached to itself from 1 to 3 halogen atoms and at least one hydrogen atom, removing the extract from the solution, and stripping said extract to recover the said dimethylacetamide.

2. In a process for producing substantially pure dimethylacetamide, from an aqueous solution thereof, the steps of contacting said solution with 1,1,2-trichlorethane, removing the extract from the solution and stripping said extract to recover the said dimethylacetamide.

3. In a process for producing substantially pure dimethylacetamide from an aqueous solution thereof, the steps of contacting said solution with a halogenated hydrocarbon of a group consisting of chloroform, ethylene dichloride and 1,1,2'-trichlorethane, removing the extract from the solution, and stripping said extract to recover the said dimethylacetamide.

RUDOLPH L. HEIDER.

REFERENCES CITED

The following references are of record in the file of this patent:

UNITED STATES PATENTS

| Number | Name | Date |
| --- | --- | --- |
| 2,401,234 | Farlow | May 28, 1946 |

FOREIGN PATENTS

| Number | Country | Date |
| --- | --- | --- |
| 403,508 | Germany | Sept. 26, 1924 |

OTHER REFERENCES

Lachman: "Am. Chem. J.," vol. 18 (1896), p. 607.

Hofmann: "Ber. deut. chem.," vol. 5 (1872), p. 247.

Behrend: "Liebigs Annalen," vol. 422 (1920), p. 98.

Beilstein: "Handbuch der Organische Chemie," vol. IV, 2nd sup., p. 563 (1942).